United States Patent

Gebhardt Jr. et al.

(10) Patent No.: US 6,963,911 B2
(45) Date of Patent: Nov. 8, 2005

(54) DISTRIBUTED ELEMENT NETWORK MANAGEMENT

(75) Inventors: Ronald L. Gebhardt Jr., Delran, NJ (US); Mark M. Morehouse, Doylestown, PA (US); Marlin McGregor, Berwyn, PA (US); Daniel C. Fiorella III, Blue Bell, PA (US)

(73) Assignee: General Instrument Corporation, Horsham, PA (US)

( * ) Notice: Subject to any disclaimer, the term of this patent is extended or adjusted under 35 U.S.C. 154(b) by 731 days.

(21) Appl. No.: 09/909,220

(22) Filed: Jul. 19, 2001

(65) Prior Publication Data

US 2003/0018768 A1 Jan. 23, 2003

(51) Int. Cl.[7] .............................................. G06F 15/173
(52) U.S. Cl. ...................... 709/223; 709/202; 709/224; 709/250
(58) Field of Search ................................ 709/250, 202, 709/218, 223, 224, 232

(56) References Cited

U.S. PATENT DOCUMENTS

| | | | | |
|---|---|---|---|---|
| 5,751,963 A | | 5/1998 | Umetsu | ................. 395/200.53 |
| 6,064,723 A | * | 5/2000 | Cohn et al. | ............... 379/88.14 |
| 6,336,118 B1 | * | 1/2002 | Hammond | ............... 707/103 Y |

FOREIGN PATENT DOCUMENTS

| | | | |
|---|---|---|---|
| EP | 1 022 699 A2 | 7/2000 | ........... G07F/19/00 |
| EP | 1 067 732 A2 | 1/2001 | ........... H04L/12/24 |
| WO | WO 97/05703 | 2/1997 | |

\* cited by examiner

Primary Examiner—Gertrude A. Jeanglaude
(74) Attorney, Agent, or Firm—Mayer Fortkort & Williams PC; Karin L. Williams

(57) ABSTRACT

A network of managed elements, in which code necessary for the integration of the elements into the network is contained in the elements themselves. A network proxy polls the elements to determine the presence of a new element or a revision to the code of an existing element. When found, code is copied from the element to the proxy, which serves as an interface between the elements and a network management system.

29 Claims, 2 Drawing Sheets

DISTRIBUTED ELEMENT NETWORK MANAGEMENT

BACKGROUND OF THE INVENTION

The present invention relates generally to the management of a network and, more particularly, to a network that connects a variety of elements.

Networks are aggregates of elements that interact with one another. These elements must communicate across the network with each other, which necessitates that they be identified and understood by the network itself. These elements are generally of dissimilar function, design and manufacture, yet must interact seamlessly with one another across the network. To enable such communication, the network must be provided with the information necessary for the recognition and operation of each element.

One approach to this problem is to provide the network itself with the software instructions for the identification and operation of each of the elements on the network. However, for a variety of reasons, these instructions often are not provided at the top network level, i.e., at the level of the network management system (NMS). For example, the devices may be unable to communicate directly with the NMS due to the lack of Ethernet port capability, or the design of the network may be maximized in a manner that (as often is the case) militates against storing this information directly in the NMS. Network designers may forgo providing the NMS with the often substantial firmware necessary to support simple network management protocol (SNMP). The devices may also be unable to communicate directly with the NMS due to incompatibility with SNMP.

These capabilities can be provided by a network management proxy that is employed to monitor the status of a collection of elements or devices that can not communicate directly with the NMS. A proxy is a device (which can also be implemented as software, firmware, or other forms of code) that acts as an intermediary between the networked elements and the NMS. The proxy is capable of communicating with a network management system and also is capable of communicating with the other elements in a network. The proxy (sometimes referred to as the master element) serves as a translator, or bridge, between the network management system and those elements in the network not otherwise capable of communicating directly with the network management system for any reason. The proxy contains all of the information that the NMS needs to manage the element collection, and provides an efficient approach to managing a fixed, unvarying set of networked elements. However, when a new type of element or a new version of an existing element is added to the collection managed by the proxy, the proxy requires an upgrade in its software or firmware in order to monitor the new or changed element. Such upgrades can be costly in terms of time and money, particularly for networks in which elements frequently are added or upgraded.

The present invention is directed to the problem of simplifying and reducing the cost of providing a network with information necessary to the proper operation of a networked collection of elements.

SUMMARY OF THE INVENTION

The present invention simplifies the task of providing the proxy with current and accurate information concerning the operation of new or upgraded networked elements by placing this information in the elements themselves. Whenever a new element is added to the network, the proxy interrogates it to determine its device type and, in the case of updates to old elements, its revision. The information necessary for the proper operation of the element and its integration with the network is copied from the element to the network proxy.

Among the advantages of this approach to the management of a network of elements is that it obviates the need to manually update the network proxy with new software to control new or upgraded elements, and thus also eliminates the attendant investment of time, labor and other support costs imposed by prior approaches. The present invention thus assures that all of the elements are automatically properly integrated into the network at the time they are added to the network.

BRIEF DESCRIPTION OF THE DRAWINGS

The above-mentioned features and advantages of the invention will become more apparent from the following detailed description when taken in conjunction with the accompanying drawings, wherein.

DETAILED DESCRIPTION

In a distributed element network management system, a master element or proxy is used to handle interactions between the elements and the network. The managed elements are independent devices that are capable of performing all of their necessary functions without the aid of the proxy. (For the purposes of this discussion, the term "element," as taken in this context, is understood to include any part of a network that is capable of communicating with a network management system, either directly or via a proxy agent. Examples of such elements are nodes, devices, managed devices, modules, and objects.) The proxy is capable of communicating with the network management system over a chosen medium (e.g., coaxial cable, T1 line, telecom network, etc.). The proxy allows the NMS to manage a collection of elements that otherwise can not communicate with the NMS, either because they are not compatible with the network protocol employed or with the transmission medium used.

Figure 1:
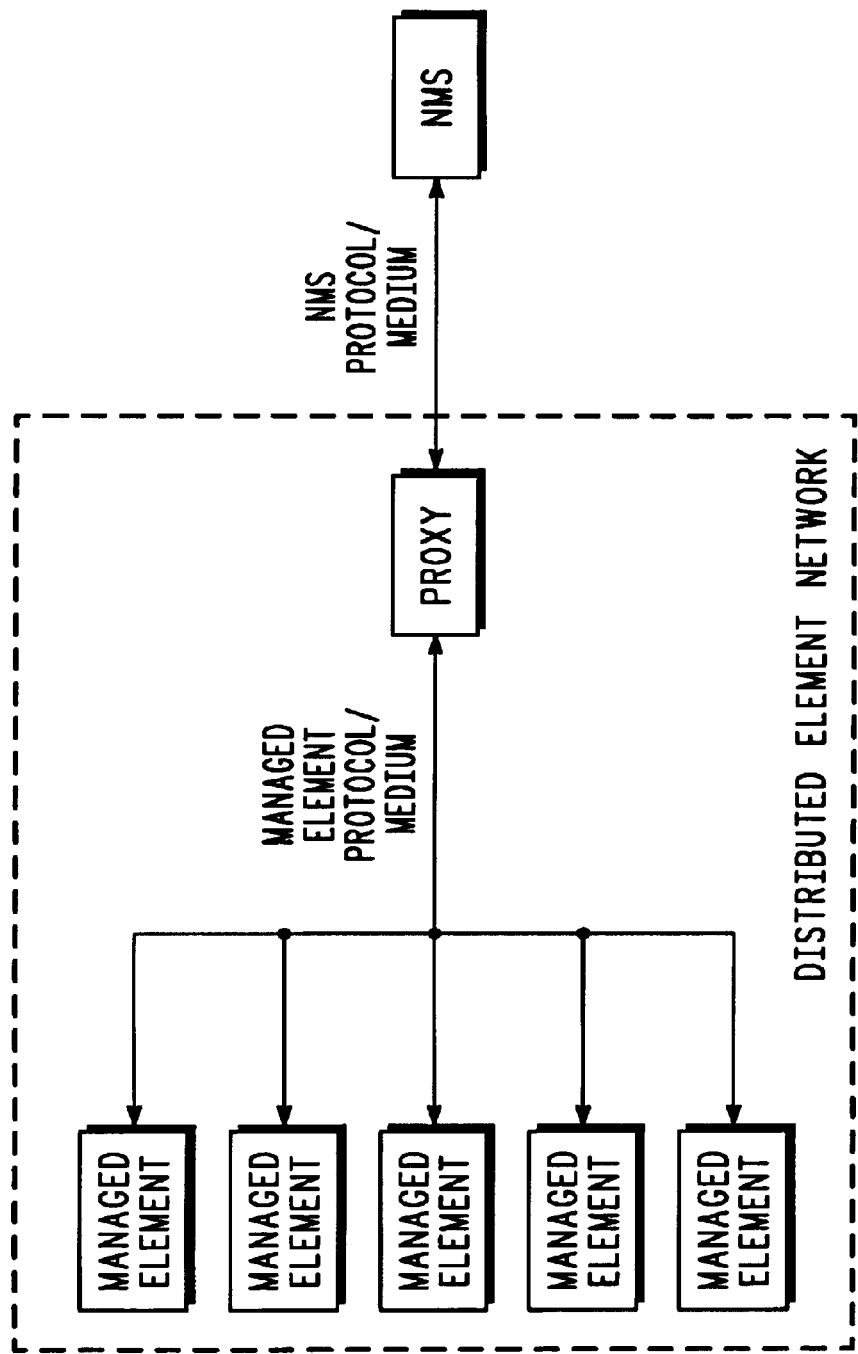
FIG. 1 is a schematic illustration of a distributed element network management system constructed according to the principles of the invention.

In a known system, the proxy contains all of the information necessary to monitor status and control the elements in its domain. In the distributed element network management system of this invention, the proxy contains very little information regarding the managed elements, save the proxy-element protocol for interrogating the elements. Instead, the necessary information is contained in the elements themselves, and is shared with the proxy at the time the element is discovered (see FIG. 1). The proxy communicates with all of its managed elements to determine if any new elements have been added, and obtains from each new element the code necessary for the proper integration of that element into the network. (While it is preferred that the transfer of code be under the control of the proxy, according to an alternative embodiment the managed element itself announces its presence to the proxy and manages the transfer of its code to the proxy.)

When the proxy starts up, it actively attempts to detect the presence of all elements that it is responsible for managing by polling all of its slots. (Alternatively, the proxy may be said to begin by polling all of its ports.) When a new element is discovered, the proxy interrogates the element to determine its device type and revision. In the preferred embodiment, the proxy issues a command that requires the element to respond with identifying information. In this case, the element is required to respond with information that includes the type of element, the revision of its network management process or subagent and its serial number. (The precise mechanism of interrogation may be implemented by any known methods.) If the element is new (either in type or revision), the proxy copies a sub-agent process from the element to itself. The sub-agent process is a piece of software or firmware code originally carried by the device that is intended to execute within the proxy. It contains all of the information and conversion routines necessary to translate commands from the NMS to the native protocol of the element, send the translated request to the element, retrieve a response, build and transmit a response back to the NMS, and otherwise operate as intended on a network. The proxy also uses the sub-agent to monitor the new element, detect the presence of alarm conditions, and generate alarm messages to the NMS (e.g., when the device is removed from the system, when the unit falls, or is otherwise tampered with or altered).

The proxy also transfers all other process agents and files necessary for the control and monitoring of the new element to itself from the element. These agents and files are not limited to network management activities. For example, they may include any menus required for the operation of a front panel control keypad, display, or other interface. Indeed, any file or agent process necessary to operate or interface with the element can be carried and transferred to the proxy as necessary. The agents are designed to run on the proxy; they do not need to be executable on the element in which they are stored.

The code can be stored on the element in a number of ways. For example, it can be stored as binary data in non-volatile memory. The binary data can be the actual binary executable code, an s-record or any other format. Many different known storage formats can be used. The proxy does not need to know where the code is located on the element; it suffices that the element knows where to look when it retrieves the data from memory and sends it to the proxy.

Depending on the amount of memory provided with each element, a number of useful features can be "piggy-backed" onto a given device. For example, a device can be given the code for the operation of devices that have not been designed with this system in mind, so that upon detection of such a device in the network, the proxy could look to a second device for updated code regarding the operation of the first device. In another embodiment, each element or device can be provided with the capacity for carrying two sets of operating firmware, each set of which contains one version of the necessary data and code for network management, each set residing in a bank. When a device leaves the factory, firmware is programmed in the first bank and a second bank is left empty. When an operator upgrades the firmware, the new firmware is stored in the second bank. A third upgrade would be stored in the first bank. The location of each upgrade is always toggled between the two banks, which allows the operator to revert to the last version of the code for any reason (e.g., correcting compatibility problems). Because a new version of code might add a new feature or take one away, each version also preferably carries its own copy of the sub-agent or menu agent or any other files necessary for network management.

Figure 2:
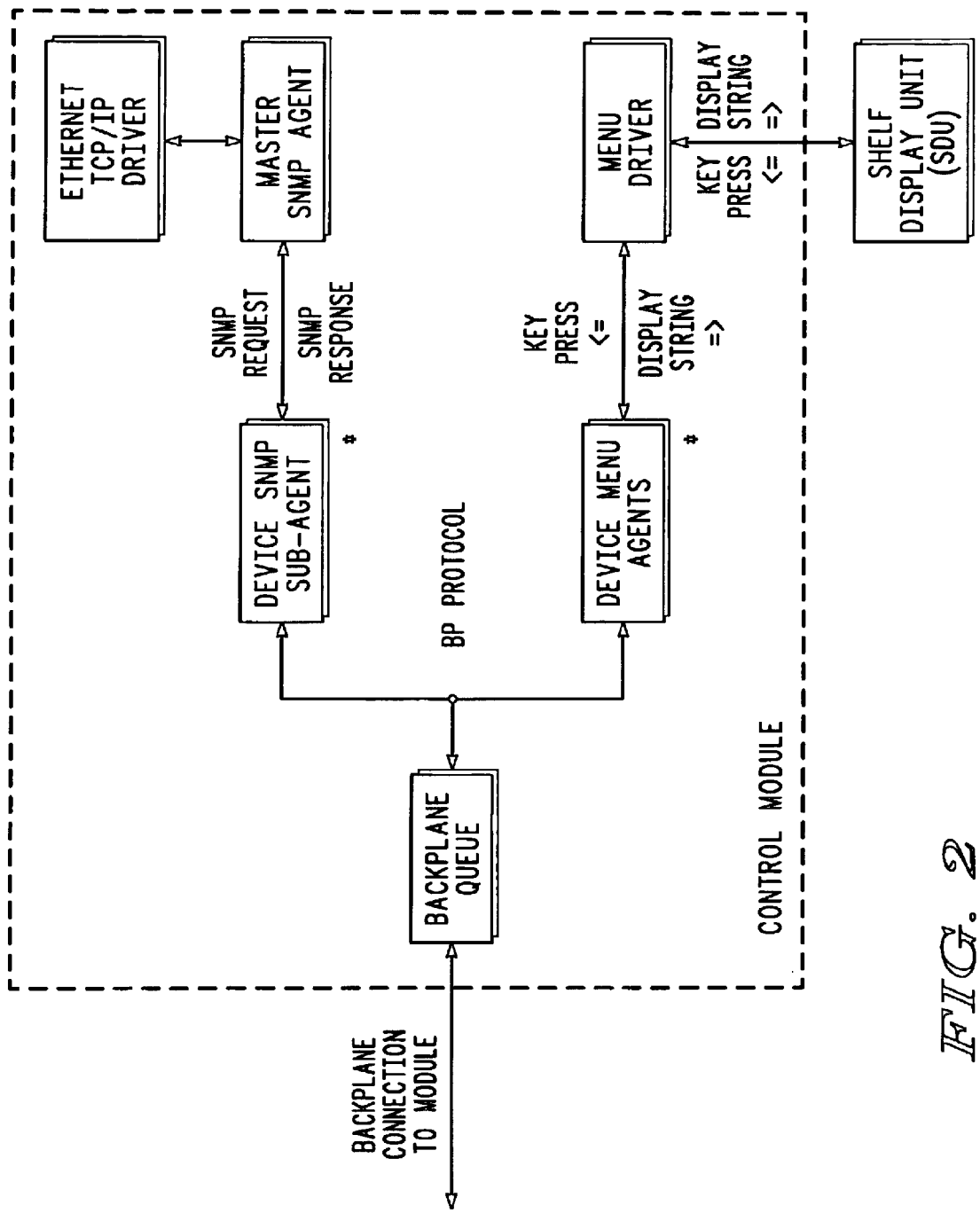
FIG. 2 illustrates an embodiment of the control module or proxy of a system constructed according to the principles of the invention.

FIG. 2 illustrates the use of this invention in the design of the Motorola Corporation's OmniStar® GX2 broadband cable-optics platform, in which the managed elements are individual independent modules or elements, such as application modules and power supplies, that are connected to a proxy by a backplane. Each element contains its own microcontroller and firmware code. The platform is provided with a proxy in the form of a control module (CM), which is a device that is capable of communicating with a NMS over an Ethernet channel via SNMP. The control module monitors each application module and power supply slot to detect the addition of a new module. If a new module is discovered, the control module will examine the new module for its device type and revision. If the control module does not currently possess the necessary agents to manage the new module, the control module commands the new module to transfer the needed agents and files to the control module. In particular, the control module retrieves the version of the sub-agent process from the element during discovery. The CM then compares this identifier to the identifiers of the sub-agent processes that are currently executing in the CM. (These identifiers are kept in a list or table for this purpose.) The control module requests at least two object from the new module: a SNMP sub-agent, and a Menu Agent. Additionally, the CM transfers any other needed files as required, such as bitmaps, Java applets, birth certificates, and manuals.

In the embodiment illustrated in FIG. 2, the SNMP sub-agent is a firmware file written to run on the CM. However, it could be provided in any form of code that can be provided with the element in question. It contains all of the information necessary for the CM to function as a NMS proxy for the application modules. Once it is transferred to the CM, the CM will load the file into its memory and start the sub-agent process. Once it is loaded and running, it will handle communication from the NMS to control or monitor the new module. It also polls each module to detect the presence of any alarm conditions and generate any necessary traps back to the NMS. (Traps are sent back to the NMS to notify it of any alarm conditions or events that occur with or in the managed elements or proxy.)

The Menu Agent is a firmware file used by the CM to provide a menu system so that the operator can control and monitor the device via an optional Shelf Display Unit (SDU). The Menu Agent receives user inputs from the SDU, translates them into a menu structure and feeds back a display message to the operator. The Menu Agent also handles the reading or writing of any data to the module it was loaded from When a new element is introduced, the network operators need not concern themselves with the task of manually upgrading the proxy to accommodate the new elements, since the invention accomplishes this automatically.

Although various embodiments are specifically illustrated and described herein, it will be appreciated that modifications and variations of the present invention are covered by the above teachings and within the purview of the appended claims without departing from the spirit and scope of the invention. For example, the NMS could dynamically load all of the relevant data and management processes from the proxies or other directly managed elements as described above.

What is claimed is:

1. A method for operating a networked group of elements, comprising the steps of:

providing at least one of the elements on a network with instructions that are located in the element;

a proxy interrogating an element to determine whether it has a new code, the proxy being an intermediate between the elements and the network; and copying at least some of said instructions to the proxy upon detection of a new code in the element.

2. The method of claim 1, wherein the instructions comprise information for the integration of the element into the network.

3. The method of claim 1, wherein the instructions comprise information for driving an interface.

4. The method of claim 1, wherein the instructions comprise information for driving an interface and for the integration of the element into the network.

5. The method of claim 1, wherein the proxy has sockets to which the elements are connected, and the proxy polls the sockets to determine the presence of elements that contain new information.

6. The method of claim 1, wherein the proxy interrogates an element to determine its device type.

7. The method of claim 1, wherein the proxy interrogates an element to determine its device iteration.

8. The method of claim 1, wherein the proxy determines whether the code is new by comparing at least a portion of it to existing code located on the proxy.

9. The method of claim 1, wherein if new code is found, the proxy copies a sub-agent from the element to the proxy.

10. The method of claim 9, wherein the sub-agent is written to execute within the proxy.

11. The method of claim 9, wherein the sub-agent does not execute within the element.

12. The method of claim 9, wherein the sub-agent contains all the code necessary to translate commands from the network to the element, retrieve a response from the element, and transmit a response back from the element to the network.

13. The method of claim 9, wherein the sub-agent monitors the element.

14. The method of claim 9, wherein the sub-agent detects the presence of alarm conditions.

15. The method of claim 14, whereupon detection of an alarm condition, the proxy forwards notice of an alarm condition to the network.

16. The method of claim 8, wherein if new code is found, the proxy copies files necessary for the control of the element from the device to the proxy.

17. The method of claim 16, wherein these files comprise code to generate menus for the operation of a user interface.

18. The method of claim 1, wherein if new code is found, the proxy copies a sub-agent and code for use by a user interface to the proxy.

19. The method of claim 1, wherein the element has memory sufficient to store at least two versions of instructions.

20. The method of claim 1, wherein the instructions are provided in the form of firmware.

21. The method of claim 1, wherein the instructions are provided in the form of software.

22. A method for managing a networked group of elements, comprising the steps of:

a) providing the elements with instructions that are located in the element;

b) providing a proxy with a proxy-element protocol for interrogating the elements, the proxy being an intermediate between the elements and the network;

c) the proxy interrogating an element to determine whether it has a new code; and d) copying at least some of said instructions to the proxy upon detection of a new code in the element.

23. The method of claim 22, wherein the proxy detects all of the elements on the network that it manages.

24. The method of claim 23, wherein after detecting an element, the proxy interrogates the element.

25. The method of claim 23, wherein if an element having new code is detected, the element transfers code from the element to the proxy.

26. The method of claim 22, wherein a sub-agent provided on the element is used by the proxy to monitor the element.

27. A computer network for controlling elements linked via the network, comprising:

a network proxy;

a plurality of elements;

code located on said elements, said code enabling a network to utilize said elements and executable on the network proxy, wherein the proxy includes a proxy-element protocol for interrogating an element to determine presence of a new code in the element and the proxy is an intermediate between the proxy and the elements, and said code is copied into the proxy upon detection of the new code.

28. A computer network for controlling elements linked via the network, comprising:

a network proxy;

a plurality of elements;

a sub-agent provided by said plurality of elements, said subagent enabling a network to utilize said elements, wherein the proxy includes a proxy-element protocol for interrogating an element to determine presence of a new sub-agent in the element and the proxy is an intermediate between the proxy and the elements, and the new sub-agent is copied into the proxy upon detection of the new sub-agent.

29. A computer network as set forth in claim 28, further comprising a menu agent located on the elements for enabling an operator to interface with the element.

* * * * *

UNITED STATES PATENT AND TRADEMARK OFFICE
CERTIFICATE OF CORRECTION

PATENT NO. : 6,963,911 B2
DATED : November 8, 2005
INVENTOR(S) : Ronald L. Gebhardt, Jr. et al.

It is certified that error appears in the above-identified patent and that said Letters Patent is hereby corrected as shown below:

Column 4,
Line 24, after "two", change "object" to -- objects --.
Line 49, after last word "from", insert -- . --.

Column 6,
Line 46, after "determine", insert -- the --.

Signed and Sealed this

Fourth Day of April, 2006

JON W. DUDAS
*Director of the United States Patent and Trademark Office*